May 28, 1968

A. J. WENZEL ET AL 3,385,609

TOWING HITCH

Filed June 30, 1966

Inventors
ALFRED J. WENZEL &
ALWIN K. HANTEL

BY Tweedale & Gerhardt
Attorneys

May 28, 1968  A. J. WENZEL ET AL  3,385,609
TOWING HITCH
Filed June 30, 1966  2 Sheets-Sheet 2
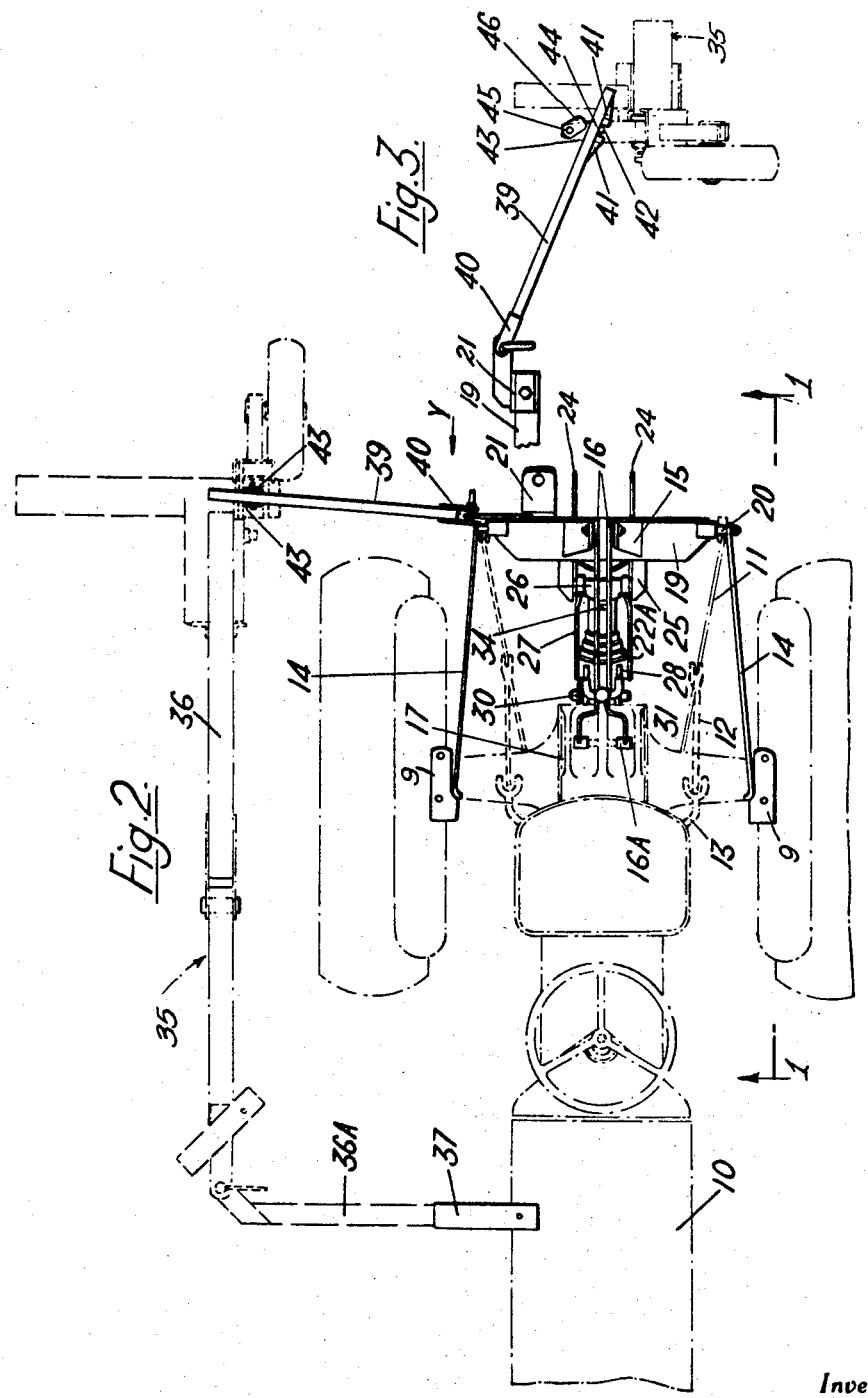
Inventors
ALFRED J. WENZEL &
ALWIN K. HANTEL
BY Tweedale & Gerhardt
Attorneys

United States Patent Office 3,385,609
Patented May 28, 1968

3,385,609
TOWING HITCH
Alfred J. Wenzel, Kassel-Kirchditmold, and Alwin K. Hantel, Kassel, Germany, assignors to Massey-Ferguson G.m.b.H., Kassel, Germany
Filed June 30, 1966, Ser. No. 561,944
Claims priority, application Great Britain, July 7, 1965, 28,878/65
5 Claims. (Cl. 280—479)

ABSTRACT OF THE DISCLOSURE

A tractor hitch comprising a drawbar assembly pivotally mounted on the draft links of the tractor, upper and lower selectively employable trailer coupling elements and a tractor coupling element carried by the drawbar, the tractor coupling element being pivotally connected to the tractor above its rear axle and one of the trailer coupling elements being downwardly spaced from the drawbar and from the other trailer coupling element.

---

The upper coupling element is preferably a clevis, and the lower coupling element is preferably an upwardly open hook with a retaining or closure member having a control operable from the tractor seat.

The tractor-coupling element comprises manually lockable links pivotally connected to an upright member of the assembly.

The drawbar assembly may include a further coupling element at or adjacent one side for use in attaching a side-mounted implement and may also include a gearbox adapted for connection to the tractor power take-off device and to said implement, and the gearbox may itself have a power take-off device.

An embodiment of the invention will now be described by way of example, with reference to the accompanying drawings, in which:

FIG. 2 is a plan view corresponding to FIG. 1 with part of a side-attached implement shown; and FIG. 3 is a view of a part of the implement attachment in the direction of the arrow Y in FIG. 2.

Figure 1:
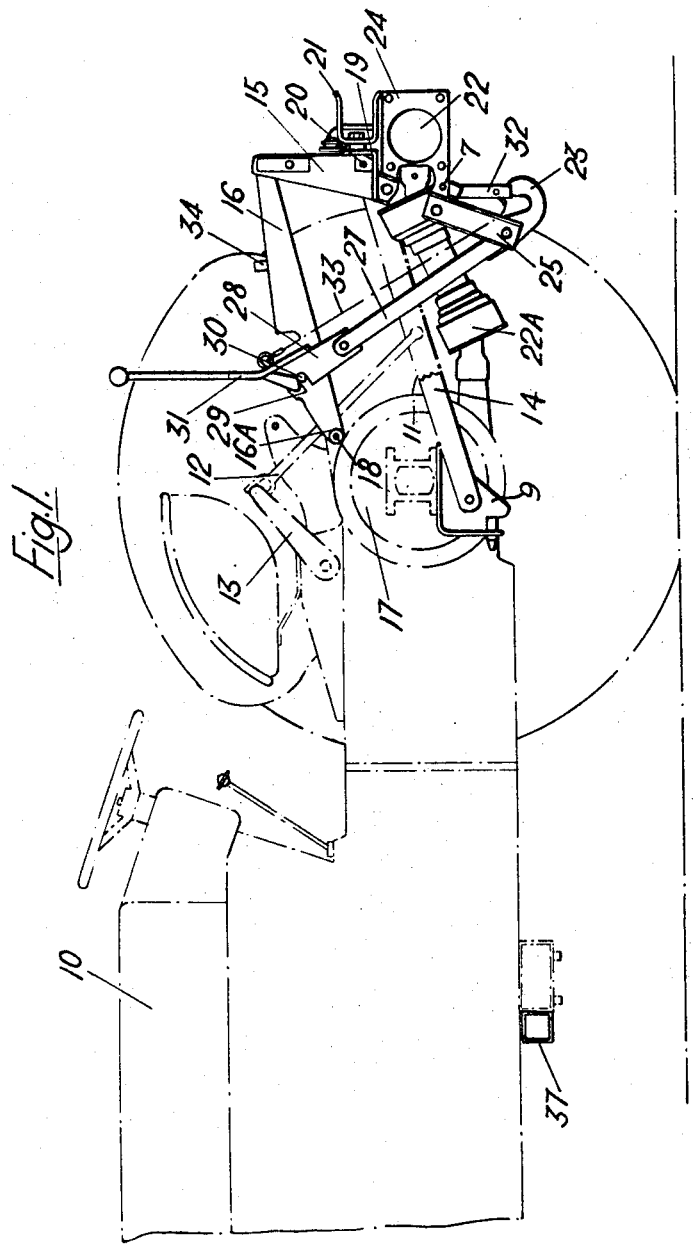
FIG. 1 is a longitudinal sectional view through part of a tractor and one embodiment of a hitch according to the present invention on the line 1—1 of FIG. 2 of the tractor.

The hitch shown in the drawings is attached to a tractor 10 having lower links 11, lift links 12 and hydraulically actuated lift arms 13. The lower links 11 are braced against lateral movement by brace links 14. Each of these brace links 14 is attached with one end at a pin 20 which also engages one end of the corresponding lower link 11. With the other end each brace link 14 is fixed to a connecting part 9 which is attached to the rear axle housing. The hitch as shown in FIG. 1 has an upright member 15 pivotally connected at its upper end on the rear ends of a pair of closely spaced parallel upper links 16 arranged in a plane substantially parallel to the lower links 11. The upper links 16 have tractor-coupling elements in the form of sleeves 16A thereon pivotally attached to a top part of the tractor rear axle casing 17 by a pin 18. A crosspiece or drawbar 19 of right-angle section extends between the rear ends of the lower links 11 and carries pins 20 which engage the ends of the lower links 11. The upright member 15 is secured to the crosspiece 19 by welding. The crosspiece 19 also serves as a mount for selectively employable trailer-coupling elements in the form of a clevis 21 and a hook 23, and for a bevel gearbox 22. Bolts secure the clevis 21 to the crosspiece 19. The bevel gearbox 22 is mounted between two laterally spaced vertical plates 24 welded to the crosspiece 19 and projecting downwardly therefrom. A pair of downwardly extending channel-section arms 25 are bolted to the plates 24 and the lower ends of these are fast with a bar or rod 26 to which is secured the hook 23.

A pair of upwardly and forwardly extending locking members 27 are journalled on the rod 26 each adjacent a plate 24, and terminate in a pair of latch plates 28 having notches 29 which engage outwardly protruding pins 30 on the upper links 16 adjacent the pin 18. A forked handle 31 bridges and is attached to the two latch plates 28.

Swingably mounted on the plates 24 at pivot 7 is a pair of retaining bars 32 which can be deflected to one side by a wire 33 extending from the retaining bars 32 to a position adjacent handle 31 so as to be under the manual control of the tractor driver.

The locking members 27 can pivot rearwardly on the bar 26 when not in their locking position and a stop 34 is provided on the upper links 16 to prevent undue pivotal movement.

As shown in FIGS. 2 and 3, an implement 35 is attached at the forward end of its drawbar 36 to a transverse beam 36A fixed to and extending from a tube 37 secured to the underside of the tractor 10 between its front and rear wheels. At the rear, the implement 35 is connected to the adjacent end of the crosspiece 19 by a rod 39 having a clevis 40 at one end, and a pair of sloping lugs 41 which between them define a slot 42 at its other end. The implement 35 carries a pair of upstanding plates 43 which are joined by bridging pins 44 and 45, one intermediate the ends of the plate 43 and the other adjacent the top of the plate 43. The slot 42 between the sloping lugs 41 is adapted, on insertion of the rod 39 between the upstanding plates 43, to engage the pin 44 for correct lateral positioning of the implement 35, relative to the tractor 10. The sloping lugs 41 permit the rod to ride between the upstanding plates 43 until such engagement is effected. A block 46 hangs freely from the upper bridging pin 45 and is pushed to one side by the rod 39 until such time as the slot 42 engages pin 44 and then hangs down to prevent the disengagement of the slot 42 with the pin 44.

In operation, the hitch is capable of coupling to the tractor, trailers of the four-wheel type in which all the weight of the trailer is supported on the trailer wheels, and two-wheel trailers in which part of the weight of the trailer is carried on the tractor. In the case of a four-wheel trailer, the trailer drawbar is simply connected to the hitch clevis 21 by a bolt passing through the trailer drawbar and the clevis 21. In the case of a two-wheeled trailer equipped with a ring at the front end of the drawbar and assuming the locking member 27 to be against stop 34, the tractor is reversed into position, with the hook 23 positioned at a sufficiently low level, so that, on raising the hitch by means of the tractor lift arms 13, lift links 12 and lower links 11, the hook 23 engages the ring and lifts the front end of the trailer. The hitch is raised sufficiently high for notches 29 on the latch plates 28 to be manually engaged with the pins 30, and then the trailer weight is allowed to be carried by the hitch alone without the aid of the tractor hydraulic lift. The hitch forms a braced frame when the latch plates 28 are engaged with the pins 30.

When the trailer is to be disconnected from the tractor, the tractor hydraulic lift is used to take the weight of the trailer, while the latch plates 28 are disengaged from the pins 30. The trailer drawbar is then lowered onto the ground and the retaining bars 32 are drawn aside by the wire 33 to enable the hook to be disengaged from the trailer ring.

The advantage of the hitch shown in FIGS. 1 and 2 is that the manual controls are placed close to the driver, and his veiw of the hook 23 is not obstructed during its engaging travel. Furthermore, because the crosspiece travel is substantially vertical during raising and lowering of the hitch, the gearbox always remains at a constant distance above the hook and does not "mask" the engagement of the hook with the ring.

The bevel gearbox 22 is driven from the tractor power take-off through a universally jointed shaft concealed in FIGS. 1 and 2 by a guard 22A, and is adapted to drive the implement through a second universally jointed shaft, which is not shown. The gearbox 22 may be provided with a power take-off presented rearwardly for the purpose of supplying power to moving-floor trailers or other purposes.

An advantage of the hitch described is that the trailer can be attached to the tractor at a point within the ends of the lower links. It will be appreciated that the two-wheel trailer attachment point could be positioned to the rear of the ends of the lower links, but it may not readily be appreciated that such an arrangement would incur the disadvantage of reducing the steering control of the tractor due to the rearward tipping tendency of the tractor and the consequent loss of front wheel adherence. The hitch described above does not suffer from this disadvantage.

We claim:

1. In a tractor having a pair of laterally spaced draft links and a power lift for raising and lowering the draft links, a hitch comprising a drawbar assembly with a drawbar pivotally mounted on said draft links, an upper trailer coupling element in form of a clevis and a lower trailer coupling element in form of an upwardly open hook with a retaining member having a control operable from the seat of the tractor, said upper and lower trailer coupling elements being selectively employable, and a tractor coupling element carried by the drawbar, the tractor coupling element being pivotally connected to the tractor above its rear axle, and one of the trailer coupling elements being downwardly spaced from the drawbar and from the other trailer coupling element, said drawbar assembly being releasably lockable by a latch device comprising a pin on the tractor coupling element and a plate having a notch for engaging said pin and carried on one end of a link of which the other end is pivotally attached to the drawbar assembly.

2. A hitch as claimed in claim 1, wherein said drawbar has secured thereto two laterally spaced vertical plates projecting downwardly therefrom, the said plates having fixedly secured thereto the upper portions of two downwardly projecting arms which at their other ends are connected by a rod on which said end of the link is pivoted and to which said hook is secured.

3. A hitch as claimed in claim 2, wherein said plates mount between them a bevel gearbox driven from a power take-off device on the tractor.

4. A hitch as claimed in claim 1, wherein there are two pins and two side-by-side links with notched plates disposed on opposite sides of the tractor-coupling element, and a control handle operable from the tractor seat is provided which is attached to the plates by a forked portion which straddles the tractor-coupling member.

5. A hitch as claimed in claim 1, wherein the drawbar assembly has a further coupling element for use in attaching a side-mounted implement, said coupling element comprising a rod having at one end a clevis attached to one end of the drawbar and having at its other end a pair of sloping lugs defining between them a slot for engagement with a pin on the side-mounted implement.

References Cited

UNITED STATES PATENTS

| 2,531,768 | 11/1950 | Cline et al. | 172—248 |
| 2,640,708 | 6/1953 | Fraga | 280—474 X |
| 3,078,106 | 2/1963 | Pedersen | 172—439 X |
| 3,292,949 | 12/1966 | Restall | 280—479 |

FOREIGN PATENTS

| 920,998 | 3/1963 | Great Britain. |

LEO FRIAGLIA, *Primary Examiner.*